United States Patent
Arnaud et al.

(10) Patent No.: US 6,219,668 B1
(45) Date of Patent: Apr. 17, 2001

(54) METHOD FOR A PAPERLESS OFFICE MANAGEMENT SYSTEM USING A SET TABLE AND NAME-DAY-MESSAGE DOCUMENT DATA

(76) Inventors: Jean Pierre Alfred Arnaud, 23, rue de Pontoise, F-95160 Montmorency; Bernard Marc Hautbergue, 24, avenue d'Estienne-d'Orves, F-94340 Joinville-le-Pont, both of (FR)

( * ) Notice: Subject to any disclaimer, the term of this patent is extended or adjusted under 35 U.S.C. 154(b) by 0 days.

(21) Appl. No.: 09/117,732
(22) PCT Filed: Feb. 5, 1997
(86) PCT No.: PCT/FR97/00231
§ 371 Date: Sep. 8, 1998
§ 102(e) Date: Sep. 8, 1998
(87) PCT Pub. No.: WO97/29442
PCT Pub. Date: Aug. 14, 1997

(30) Foreign Application Priority Data

Feb. 5, 1996 (FR) .................................................. 96/01358
Aug. 9, 1996 (FR) .................................................. 96/10066

(51) Int. Cl.⁷ ...................................................... G06F 17/21
(52) U.S. Cl. ................................. 707/10; 707/104; 707/9; 707/513; 707/514; 709/203; 709/219; 709/229
(58) Field of Search ............................ 707/2, 3, 10, 513, 707/514, 907, 104, 9; 709/203, 219, 229

(56) References Cited

U.S. PATENT DOCUMENTS

| | | | |
|---|---|---|---|
| 5,649,191 | * 7/1997 | Hirano et al. | 707/102 |
| 5,771,380 | * 6/1998 | Tanaka et al. | 707/104 |
| 5,802,529 | * 9/1998 | Nakatsuyama et al. | 707/513 |
| 5,819,295 | * 10/1998 | Nakagawa et al. | 707/203 |
| 5,848,248 | * 12/1998 | Kawasaki et al. | 709/238 |
| 5,862,321 | * 1/1999 | Lamming et al. | 395/200.3 |
| 5,884,321 | * 3/1999 | Meffert | 707/104 |
| 5,940,829 | * 8/1999 | Tsuiki et al. | 707/10 |
| 5,940,830 | * 8/1999 | Ochitani | 707/10 |

FOREIGN PATENT DOCUMENTS

| | | |
|---|---|---|
| 0 273 435 | 7/1988 | (EP) . |
| 0 438 020 | 7/1991 | (EP) . |
| 0 471 639 | 2/1992 | (EP) . |
| 0 654 746 | 5/1995 | (EP) . |
| WO 93/00643 | 1/1993 | (WO) . |

* cited by examiner

*Primary Examiner*—Jean R. Homere
(74) *Attorney, Agent, or Firm*—Young & Thompson

(57) ABSTRACT

A computer operating method using a distribution program from which application programs may be retrieved and executed, includes setting up a database including at least one table of persons' names, a set table and a document table, and executing a database management distribution program for creating, updating, reproducing, moving and deleting at least the documents. A document is created from document data formed by combining at least one name from the name table with at least one data and at least one message while designating an application program, and forming, by an application program, a representation of the information content that may be accessed by an identifier related to an application program, whereafter, once the document data and the information content representation have been formed, the document data and the identifier are combined and recorded.

26 Claims, 1 Drawing Sheet

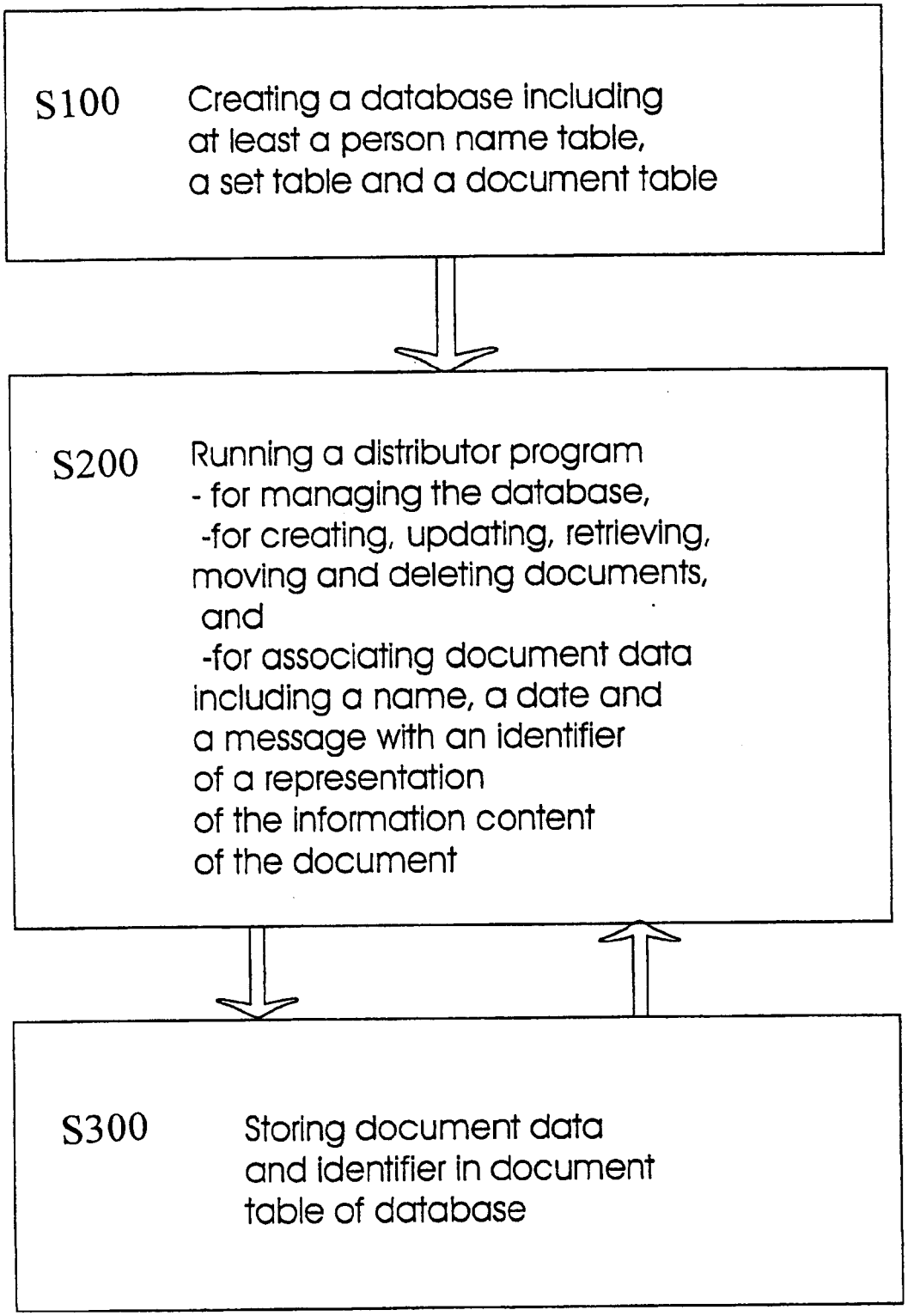

METHOD FOR A PAPERLESS OFFICE MANAGEMENT SYSTEM USING A SET TABLE AND NAME-DAY-MESSAGE DOCUMENT DATA

TECHNICAL FIELD OF THE INVENTION

The present invention relates to transmitting information between a plurality of computer programs run on the same computer or on a plurality of computers connected in a network, and to a computer operating system facilitating such information transmission. The invention also relates to a method implementing such a system and making "paperless" office management possible.

TECHNOLOGICAL BACKGROUND

Since a plurality of different application programs are used on a single computer or on a plurality of different computers, particularly in a client-server type architecture, it frequently happens that information needs to be interchanged between a plurality of computer programs. For example, European patent EP-380 211 describes in general terms the communication of information between computer programs, and in particular between application programs run on a single computer or on a plurality of computers. According to that document, the transfer of information between programs comprises using a distributor program which forms lists containing selected interchange information, information codes, and the identity of an application program. When data is to be transferred between a plurality of application programs, a sending application program produces information together with a corresponding information code; the information and the code are transmitted to the distributor program which stores them in a list; and the program compares the information code with the information codes of its own list to determine whether it matches any of its information codes relating to a plurality of application programs. If the comparison gives a positive result, then the distributor program transmits the selected information to a second application program identified by the information code.

In order to enable such an operation to be performed, it is necessary for the selected information interchanged between one application program and another to be compatible, i.e. the information must be capable of being processed in each of the two application programs. To this end, either the information is in a format that is recognized by both application programs and which can be used by the distributor program, or else the information is subjected to format conversion before being transmitted to the distributor program and after being transmitted therefrom to the destination application program.

Given the problems of interchanging information between programs using incompatible formats, more and more use is being made of formats that are compatible with numerous application programs. For example, more and more file formats, i.e. presentations of information, are being used which are recognized by a large number of application programs. Thus, for interchanging documents, there exists a "portable document format" (PDF) created at the initiative of Adobe, which format is particularly useful for composite documents. For files dedicated to storing images in dot mode, there also exists a "tagged image file" (TIFF) format which is recognized by the vast majority of the application programs concerned.

However, the system described in the above-specified document does not enable complete documents to be interchanged, but only information taken from documents. In a computer operating system, "files" represent documents, which documents may be of any type (text, graphics, images, sound). According to a known definition: "A document is a vehicle for intelligible information, rich both in its content and in its form. It is simultaneously the message, its form, its presentation, and its vehicle".

Given the ever-increasing use of such documents in formats that are recognized by numerous application programs, recognizing the entire document is posing fewer and fewer problems. Nevertheless, interchanging documents requires knowledge about their medium which is a "computer file".

In computer operating systems (which do not perform the role of the above-mentioned document distributor program), a file is a data set comprising a file name together with a certain number of attributes, in particular a creation date, a security descriptor (determining who can use the file, what can be done with the file, ... ), and attributes indicating how the file can be used (read only, archived, etc.) during operations managed by the operating system and having no bearing on content. Naturally, the file header, once its nature has been defined, may contain a certain amount of information concerning the format of the file, etc. Thus, graphic files include a standardized format header containing a certain amount of data defining the properties of the file (encoding rule, etc.).

Thus, whatever the operating system, that which represents the contents of a document is defined only by a file name which may be relatively short [12+3 characters in the "Windows" 3.1 system (registered trademark)] or relatively long [up to about 125 characters for the "Windows 95" system (registered trademark)]. Given this relatively large number of file name bytes, it would naturally be possible to define within this segment of 125 bytes a data structure conveying a certain amount of information. Under such circumstances, merely knowing the file name could give a certain amount of information about the file itself. However, the file name function and the information content function would not be separated and, in reality, it would therefore not be possible to extract information usable by the application program itself, unless each application program were to be specially coded.

Nevertheless, in known operating systems, there exists a structure which enables information to be classified on the basis of its content. Such operating systems comprise a "file managers" which builds a classification structure. For example, it is commonplace to classify documents formed in such-and-such a context with such-and-such an application program, etc. by using directories, subdirectories, etc. with access thereto optionally being authorized or refused for such-and-such an operator.

The above-mentioned problems of lack of information arise in particular in the field of electronic document management which is now considered as being an application. In their more elaborate forms, electronic document management systems essentially comprise a document base which merely comprises the document medium (computer files), a search index base which is a type of database management program, and one or more application programs enabling documents to be read, at least, and sometimes enabling new documents to be created. In particular, the database management program is intended to give access to documents as a function of their content which has been determined using specified criteria, often based on keywords.

In such electronic document management systems, information transfers of the type concerned are useful only when creating new documents, given that to consult a document, the database management program is used which, as a function of its selection criteria, gives access to the document and does not transfer information thereto. However, in an application program for electronically managing data, it can be advantageous to interchange documents with the document base and the search index base. A method of transferring information of the type described in above-mentioned document EP-380 211 can then be implemented, for example.

Consequently, given the present state of the art, and in the context of an operating system, implementing systems of the type described requires a plurality of application programs to be implemented, and when information is to be interchanged, it requires a distributor program to be implemented for interchanging the information. It is therefore necessary to use together, in the context of an operating system, at least three programs operating successively or simultaneously: two application programs which interchange information, and a distributor program. Naturally, when information transfers are frequent and always of the same type, they can be programmed to be performed directly by one application program to another, without using a distributor program, however such transfers are then extremely rigid since they must have been programmed previously and they must form part of the application programs. The information interchange is put into a format that is compatible with the operating system so that it can act as the distributor program between the applications. A simple example is the interchange of information via the "clipboard" which is to be found in a large number of computer operating systems.

In accordance with the invention, it has been observed that the information interchanged between various application programs is usually information of an extremely small number of types. Consequently, if the designation of a document also includes the association of a certain number of items of information within this small number of types, then a large number of information transfers become superfluous.

We consider an example illustrating the above remarks in the context of the "Windows" (registered trademark) operating system. The identification of a file comprises: a date (creation date), which date is usually input automatically but which can be modified; a file name which must be input by the operator and which is generally an element of information constituting an abbreviation reminiscent of the information content of the document; a location in the file system (directories and subdirectories) as selected by the user, generally on the basis of the current working location; and optionally other attributes. When the user has thus input the criteria relating to the file, it is difficult for a third party to know what is contained in a document represented by the computer file.

In contrast, if, as in the method of the invention, the file name corresponds to a summary in a few words of the content of the document, and if at least one name (of a person or of a corporation), in general a destination or a sender, is also associated with the file name and with a date representing the date of arrival or departure of the document, and given the location of the file (directory, subdirectory), a third party can rapidly discover the bare essentials about the document, and this relatively superficial knowledge can either make it unnecessary to consult documents that are manifestly irrelevant, or else, on the contrary, can give very fast access to the desired document without searching through a relational database using specified criteria (keywords).

The invention thus relates to such a system, i.e. a system in which data defining a "document" includes a certain amount of information relating to the document, said information comprising at least a date, a name, and a message, a particular directory or subdirectory name, and in hidden form a "computer file name" which may merely be a number in a list which does not contain duplicate numbers. Naturally, other information may be useful, for example the fact that the document is one that has been received or sent in a particular management context, the name of the creator of the document, another date, etc., however any additional information may require additional inputting and may be of limited interest only.

The above-mentioned "name-date-message" data preferably corresponds to the entries that have been used for many years in the mail registers of businesses; this makes the system understandable to all staff of a service, a business, or an association, since the staff can adapt easily to handling documents according to the invention since they are accessible simply on the basis of said "name-date-message" data.

Consequently, the invention relates to managing information transfers between application programs in such a manner that only genuinely useful transfers are performed. When a document comes in from the outside, it is clearly necessary to input a name, a message, and possibly also a date (the date may automatically be taken to be the present date). Nevertheless, before a document is created or while it is being created, the name and the associated message are defined, preferably with the name of the computer tool (i.e. the application program) which must be or which is being used for creating the document and which therefore receives this information.

In a system of the invention, the "distributor program" for distributing the above-mentioned document therefore contains a certain amount of basic information which can be transmitted directly without needing to come from another application program. This information is incorporated in a database and represents the majority of the information required by the application programs.

The role of the distributor program is advantageously performed directly by the operating system implemented on the computer. Under such circumstances, it can either be a genuine operating system which calls application programs when documents are to be made with such-and-such an application program, or else it may be a "multipart" operating system in which a "distributor" program which manages document designations in accordance with the invention calls application programs, sending them information and possibly receiving information from them, and classifying for conservation purposes any information which may optionally be transmitted to other application programs. In which case, the structure is one in which the distributor program forms an "outer layer" over the basic operating system of the computer, in a manner somewhat analogous to the situation in which the program "Windows" 3.1 (registered trademark) constitutes an "outer layer" over the "MS-DOS" (registered trademark) operating system.

Thus, according to the invention and because of the distributor program, the "file manager" of known operating systems is replaced by a genuine "database manager" of a particular type which associates data from its database with each document.

SUMMARY OF THE INVENTION

More precisely, the invention provides a method of operating a computer, the method being of the type implementing a distributor program constituting a manager of computer entities classified in sets and from which application programs can be called and run; according to the invention, the method comprises:

creating, in a computer mass memory, a database comprising at least a person name table, a set table, and a table of documents each of which belongs to at least one set; and running, on the computer, a distributor program for managing said database and organized at least to create, to update, to retrieve, to move, and to delete documents, said step of running the database manager program on a computer comprising, for creating a document:

the database manager distributor program forming document data by associating at least one name from the name table with at least one date and at least one message, with an application program being designated;

the application program forms a representation of an information content accessible by an identifier associated with an application program; and once the document data has been formed and once a representation of the information content has been formed, and only if the application program designated with the document data and the application program associated with the representation are identical or compatible, the manager program associates document data and the identifier of said representation and the distributor program stores document data and the identifier in at least the document table.

Preferably, the database has a table of subsets each belonging to at least one set. It is then convenient for each set to have a normally empty transfer subset, which subset temporarily contains documents provided for other subsets of the set concerned. Passing in this way via a transfer subset can either be compulsory prior to passing to another subset, or else can be used solely when the destination subset has not yet been identified. Similarly, the database may contain a normally empty transfer set, which temporarily contains documents provided for other sets when the destination set has not yet been identified.

When the database is located on another computer, the distributor program of the first computer interchanges data with the other computer that has the database.

In one embodiment, advantageously implemented on a plurality of computers in a network, the database has a plurality of databases of compatible structures which are logically associated to constitute a single database accessed by the distributor program of each computer running the method.

It is advantageous for the database also to include a table of capacities in which a record has at least a reference to a person name, a reference to a set name, and a capacity specifying the role played by said person in said set.

Thus, in a preferred embodiment, the operations of moving, copying, and deleting documents are performed by the distributor program, with application programs serving only to modify the information content of documents.

In an embodiment, the distributor program is run directly by the operating system implemented on the computer.

The database preferably contains diary information contained in the document table or in a special diary table, and the method further includes associating diary data with the document data.

The invention also provides a method of filling in forms, which method is capable of constituting an application program for implementing the above-specified operating method in the context of paperless office management; this method of filling in forms is of the type in which a blank form has fields to be filled in, at least in part, which fields are distributed over the surface of one or more pages, and it comprises the following steps: in a first stage: forming an image of the blank form by optical scanning; and storing the resulting image; and in a second. stage: displaying the image of the form; and at least a group of operations comprising: positioning a cursor on the image at the location of a field; creating a field at the location of the cursor; and inputting data in the field; then printing the data input by said at least one group of operations onto a paper copy of the blank form, while not printing the image of the blank form. Preferably, the representation of the information content of the document corresponding to the form is one image comprising both the image of the blank form and the input data in the form of a single image.

BRIEF DESCRIPTION OF THE DRAWING

The single drawing FIGURE illustrates the inventive method.

DETAILED DESCRIPTION OF THE INVENTION

The invention is particularly suitable for an information management system in which representations of information contents are managed in the form of "elements", each comprising firstly a representation of an information content associated with an identifier, and secondly element data comprising at least a name, a date, and a message giving information about the information content. Such a management system may be used without any special medium, i.e. without using any paper ("paperless"). Documents received on paper are read optically and converted into the form of graphic images, and documents issued on paper are merely a copy on paper of a document existing in the information management system. The paper is used only for interchanges with the outside when the partner in an interchange sends or needs to receive representations on paper.

The database preferably also includes a table of capacities in which a record includes at least a reference to a person name, a reference to a set name, and a capacity specifying the role played by said person in said set. For example, if the set (dossier) corresponds to a commercial transaction, the capacity associated with a name in the set may be "supplier", "payer", etc. Naturally, the same name may be associated with a plurality of capacities (for example principal and payer). In another set, the same name may be associated with other capacities. A capacity is preferably associated with a name by using a pointing tool to select from a list of capacities displayed on a screen.

Thus, in accordance with the invention, the method of operating a computer is a method of the type which implements a distributor program constituting a manager of computer entities classified in sets (e.g. dossiers) and subsets (e.g. folders), and from which application programs (e.g. a word processor program, a drawing program, a spread sheet, a fax-sending program, a form-filling program, etc.) can be called and executed.

This method creates a database in a computer mass memory, the database comprising at least a table of person names, a table of sets (e.g. dossiers), preferably a table of subsets (e.g. folders) each belonging to at least one set, See S100 of the figure and a table of documents each belonging to at least one subset. The mass memory belongs to the computer concerned when it is isolated, or to one such computer or to one or more other computers when the computer concerned is in a network.

Execution on the computer of the distributor program for managing said database makes it possible at least to create, update, retrieve, move, and delete documents. This operation of executing the database manager program on a computer preferably comprises three steps for creating a document.

The first step S200 comprises the database manager distributor program forming document data by associating at least one name from the name table with at least one date and at least one message, optionally also with the designation of an application program. This step is preferably executed by inputting each item of data, where inputting can be performed either by keying information directly into a keyboard, preferably into a field displayed on the display screen of the computer, or by making a selection by using a pointing tool (such as a mouse) to point in a displayed list, or else it is executed automatically.

The second step, which is preferably but not necessarily subsequent to the first, comprises an application program (the program optionally designated in the first step) forming a representation of an information content (document content, e.g. in the form of text, an image, etc.), said information content being accessible by an identifier associated with an application program (which is not necessarily the application program used for creating the content, given that some formats are compatible with a plurality of application programs, as mentioned at the beginning of the present specification). This step thus comprises displaying an application program window and creating the specific information content with conventional information accessories (keyboard, mouse, etc.), either from an empty content or from a content that has already been created in part or in full using document data. For example, if the content is to be text, the window open in the application program may already contain an address corresponding to the person name of the document data, a header containing the dossier or set data, and optionally a document body such as a standard letter, etc.

A third step, subsequent to the two preceding steps, i.e. executed after the document data has been formed and after an information content representation has been created, comprises the manager distributor program associating the document data and the identifier of said representation, and recording at least the document data together with the identifier in the document table. See S300 This step is preferably performed automatically by the computer once a command has indicated that the creation of the information content has terminated.

In order to enable the method of the invention to be used for paperless office management, in an organization such as a service, a business, or an association, it is appropriate for the application programs which can be called by the distributor program to be suitable for creating all of the documents that are created by said service, said business, or said association. Nevertheless, there does not exist any tool making it possible to create filled-in forms independently of the form. There exist parameterized programs for filling in such-and-such a type of form, but not any type of form. Each time a new type of form needs to be filled in, the parameters defining the form need to be rogrammed. In practice, there is no program in existence capable of filling in any form, and as a result certain forms must be created outside the database system, thereby running the risk of being forgotten and not being incorporated in the system. Such a risk is unacceptable in managing a paperless system.

That is why the invention also concerns a method of filling in forms, which method may constitute an application program for implementing the above operating method in the context of a paperless office, but may also be independent of the operating method. This method of filling in forms is of the type in which a blank form has fields, at least some of which must be filled in, which fields are distributed over the surface of one or more pages. In a first stage, an image of the blank form is made by optical scanning and it is stored in the form of an image. In a second stage, the image of the form is displayed, and for at least one field to be filled in, a cursor is placed, using a pointing tool, on the image at the location of the form to be filled in, and an input field is created at the location of the cursor. Data can then be input into said input field, e.g. using the keyboard, or by inserting data from the database. When all of the desired input fields have been created and filled in, the data input into said fields is printed on a blank form on paper, omitting the image of the blank form itself. Preferably, the document which is stored as a document in the database has its information content constituted by a single image comprising the image both of the blank form and of the data that has been input. In a variant, the data input in at least one field is graphic data, e.g. a drawing.

When the form is a single-copy form, then printing is preferably performed using a non-impact printer. When the form is a multipart form, then printing preferably requires the use of a dot matrix impact printer. When the method is implemented on computers connected to a network, the printer or printers are preferably printers that are accessible via the network.

Naturally, in forms, the fields that are to be filled in can be referenced relative to data in the database. Thus, data can be inserted into fields directly from the database. Conversely, data input into the fields can be transmitted to the database. These procedures are known to the person skilled in the art and it is therefore not necessary to describe them in greater detail.

The database preferably also manages diary information contained in the document table or in at least a special diary table. The distributor program requests and/or proposes associating the created document with a diary entry (date, message, person responsible, etc.).

This method is described above for creating a single document, however it can also be used for creating a plurality of documents that are grouped together in one or more "envelopes". Documents in an envelope share a certain amount of envelope data which is advantageously contained in an "envelope table" of the database.

When the method is implemented on a single computer, the database is placed in the mass memory of the computer and the distributor program can have direct access to the database. However, when the database is located on another computer, the distributor program of the first computer interchanges data with the other computer containing the database. Thus, when a plurality of computers are connected in a network and the computer concerned does not contain the database, the distributor program running on a first computer is not genuinely the database manager, but an intermediate program which works in co-operation with a distributor program run on the other computer which works with its database, e.g. a request manager ("SQL"). This disposition can also be used on an isolated computer. It is included in the term "database manager distributor program" as used in the claims.

When the method is implemented on one or more computers connected in a network, the database may comprise a plurality of databases having compatible structures that are logically associated in a single database accessed by the distributor program of each computer running the method. Such logical association is already known and used by data-base manager programs.

The operations of creating, moving, copying, and deleting documents are preferably performed solely by the distributor program. Application programs can be used only for modifying the information contents of documents.

In an advantageous implementation, the distributor program is run directly by the operating system implemented on the computer. It is then necessary for the computer to receive either automatically on starting or shortly thereafter, or else subsequently by operator input, the identity of the database program with which the distributor program works.

The invention thus relates to a method of operating a computer which satisfies all of the conditions required for paperless office management. These conditions are essentially as follows:

it is necessary for all documents to be created entirely within the system, since subsequent incorporation can be forgotten and consequently it is necessary to have application programs enabling all of the documents that need to be created to be created effectively, even forms of arbitrary format, color, and disposition;

it is necessary for documents to be created in a context which is associated with data from the database, said data being essentially name with at least one capacity, date, and message data; and it is necessary for the system to be useable by all staff of a service, a business, or an association, and for it to be easy for the staff to adapt to handling electronic documents; in accordance with the invention, documents are accessible in the form of "name-date-message" data corresponding to entries that have been used for many years in the mail record books of businesses, and the sets (dossiers) and subsets (folders) may appear on the screen in a manner that is reminiscent of dossiers, folders, filing cabinets, etc. familiar to all of the staff and between which the movement of documents is intuitive.

The architecture of the system on which the invention is implemented has not been described since numerous architectures are suitable. Although it can be implemented on a single station, the invention is particularly advantageous with a plurality of stations. Although the database may merely be of the shared type, it is advantageously of the client-server type, i.e. a database server performs a portion of the processing (e.g. preparing "sets") and the stations perform another portion. In this context, some of the stations may be remote, e.g. having access to the database server via a public or private communications network (telephone network, Internet). Nevertheless, it is also advantageous for the method to be implemented in business networks using resources that are available by accessing such a public or private communications network, with appropriate security and protection procedures ("Internet"). According to the invention, two complementary modes can be used: distributor program access to the database server via the communications network; and access to resources connected to such network by the application programs which create documents.

The invention thus presents numerous advantages. The main advantages are an increase in work rate which is obtained by fast access to desired documents (the paperless aspect), and to eliminating most exchanges of data between application programs (computer processing aspect), and the security of processing that is obtained by single and centralized management of all files, and in particular of all diary entries (database consistency).

Naturally, the invention is described and shown only by way of preferred example and any technical equivalents for its component elements could be used without thereby leaving the ambit of the invention.

INDUSTRIAL APPLICABILITY the method of the invention is useful for transmitting and interchanging information and documents between computer programs and thus between people using such computer programs.

What is claimed is:

1. A method of operating one or several computers, to be used in a "paperless" organization office management system, the method being of the type implementing a distributor program constituting a manager of computer entities classified in sets and from which application programs can be called and run; the method comprising the steps of:

creating, in a computer mass memory of at least one computer, a database comprising at least a person name table, a set table, and a table of documents each of which belongs to at least one set; and running, on at least a computer, a distributor program for managing the database and organized at least to create, to update, to retrieve, to move, and to delete documents, each document being formed by associating, by the manager program, of document data which are formed by associating at least one name from the name table, at least one date and at least one message, with an identifier of a representation of the information content of the document, and storing by the distributor program of the document data and the identifier in at least the document table;

creating documents within the system;

providing access to the system to all of the staff of the organization, document data corresponding to entries typically used in businesses, and documents being presented in sets corresponding to dossiers familiar to all of the staff and between which the movement of documents is intuitive;

providing fast access to desired documents; and creating all documents entirely by the organization staff with application programs which can be called by the distributor program.

2. A method according to claim 1, wherein, the database also includes a subset table, each subset belonging to at least one set, and documents are presented in sets and subsets corresponding respectively to dossiers and folders familiar to all of the staff.

3. A method according to claim 1, wherein, each set has a normally empty transfer subset, which subset temporarily contains documents provided for other subsets of the set concerned.

4. A method according to claim 1, wherein, the database contains a normally empty transfer set, which temporarily contains documents provided for other sets when the destination set has not yet been identified.

5. A method according to claim 1, implemented on one of a plurality of computers connected in a net, wherein, the database has a plurality of databases of compatible structures that are logically associated in a single database accessed by the distributor program.

6. A method according to claim 1, wherein, the step of creating a database in a computer mass memory further comprises creating a table of capacities in which a record includes at least a reference to a person name, a reference to a set name, and a capacity specifying the role played by the person in the set.

7. A method according to claim 1, wherein, the operations of moving, copying, and deleting documents are performed by the distributor program, the application programs serving only to modify the information contents of documents.

8. A method according to claim 1, wherein, the distributor program is run directly by the operating system implemented on the computer.

9. A method according to claim 1, in which the database contains diary information contained in the document table or in a special diary table, the method further comprising the step of associating diary data with document data.

10. A method according to claim 1, implemented in a business network using resources that are available by accessing a communications network, with appropriate security and protection procedures.

11. A method according to claim 1, wherein, documents received on paper are integrated into the system by optically reading graphic images of information content, and each document issued on paper is merely a copy on paper of the information content of a document existing in the system.

12. A method according to claim 7, wherein, an application program is a program for implementing a method of filling in forms, of the type in which a blank form has fields to be filled in, at least in part, which fields are distributed over the surface of one or more pages, by the steps of:
displaying image of the form; and
at least one group of operations comprising:
positioning, on the form image, a cursor in relation to the image of a field to be filled in and creating an input field at the location of the cursor, such that the input field corresponds to the location of the field to be filled in; and
inputting data in the input field; then
printing, on a paper copy of the blank form, the data input by the at least one group of operations, so that input data are printed at the location of the field to be filled in, and while not printing the image of the blank form.

13. A method according to claim 12, wherein the method further comprises, in a first stage:
forming an image of the blank form by optical scanning; and
storing the resulting image.

14. A method according to claim 12, further comprising the step of storing a single image comprising the image both of the blank form and of the data that has been input, as a single image.

15. A method according to claim 12, wherein, data are input in an input field by direct insertion of data from a database.

16. A method according to claim 12, wherein, data input into an input field are transmitted to a database.

17. A method according to claim 12, wherein, when all of the desired input fields have been created and filled in, the data input into the fields is printed on a blank form on paper, omitting the image of the blank form itself.

18. A method according to claim 12, wherein, when the form is a multipart form, printing is performed using a dot matrix impact printer.

19. A method according to claim 12, wherein, when the form is a single-copy form, printing is performed using a non-impact printer.

20. A method of operating a computerized paperless office management system, the method implementing a distributor program managing computer entities classified in sets and from which application programs can be called and run, the method comprising the steps of:
creating a computer database comprising a person name table, a set table, and a table of documents each of which documents belongs to at least one set;
running a distributor program for managing the database and organized at least to create, to update, to retrieve, to move, and to delete documents,
the distributor program forming each document by
a) associating document data of i) at least one name from the name table, at least one date and at least one message, with ii) an identifier of a representation of the information content of the document, and
b) storing the document data and the identifier in at least the document table;
the application programs serving only to modify the information contents of documents;
one of the application program being a program for implementing a method of filling in forms by the steps of
displaying an image of the form; and
at least one group of operations comprising
positioning, on the form image, a cursor in relation to the image of a field to be filled in and creating an input field at the location of the cursor, such that the input field corresponds to the location of the field to be filled in; and
inputting data in the input field;
then printing, on a paper copy of the blank form, the data input by the at least one group of operations, so that input data are printed at the location of the field to be filled in, while not printing the image of the blank form.

21. A method of operating one or more computers to implement a paperless organization office management system with a distributor program managing computer entities classified in sets, the method comprising the steps of:
creating a computer database comprising at least a person name table, a set table, and a table of documents each of which documents belongs to at least one set; and
running a distributor program for managing the database and organized at least to create, to update, to retrieve, to move, and to delete documents,
using the distributor program to form document data by associating at least one name from the name table, at least one date, and at least one message to a specific document;
using the distributor program to associate the document data with an identifier representing a document information content of the specific document;
storing by the distributor program of the document data and the associated identifier in at least the document table; and
creating all documents entirely by the organization staff with application programs called by the distributor program.

22. The method of claim 21, wherein the message is a summary of a document content.

23. The method of claim 21, wherein the one name from the name table is an addressee of the specific document, the date is a reception date of the specific document, and the message relates to a content of the specific document.

24. The method of claim 23, wherein the identifier is a path name of an electronic file representing an image of the specific document.

25. The method of claim 21, wherein the set table organizes documents in related sets.

26. The method of claim 21, wherein the summary comprises a plural-word extract of a content of the document.

* * * * *